United States Patent [19]

Cap et al.

[11] Patent Number: 4,991,211

[45] Date of Patent: Feb. 5, 1991

[54] INTEGRATED DRIVING SYSTEM FOR SIGNAL-PROCESSING DEVICES

[75] Inventors: Heinrich Cap, St. Georgen-Peterzeil; Georg F. Papst; Edgar Zuckschwert, both of St. Georgen, all of Fed. Rep. of Germany

[73] Assignee: Papst-Motoren GmbH & Co. KG, Black Forest, Fed. Rep. of Germany

[21] Appl. No.: 399,405

[22] Filed: Aug. 25, 1989

Related U.S. Application Data

[63] Continuation of Ser. No. 942,834, Dec. 17, 1986, abandoned, which is a continuation-in-part of Ser. No. 733,218, May 10, 1985, abandoned, which is a continuation-in-part of Ser. No. 684,460, Dec. 21, 1984, abandoned.

[30] Foreign Application Priority Data

Nov. 29, 1984 [CH] Switzerland ............... 5685/84

[51] Int. Cl.$^5$ .................. G11B 19/00; G11B 33/00
[52] U.S. Cl. .............................. 360/84; 360/137
[58] Field of Search ............... 360/84, 85, 95, 97.01, 360/99.01, 129, 130.22–130.24, 137, 90, 93, 96.1; 369/75.1, 264; 361/399

[56] References Cited

U.S. PATENT DOCUMENTS

| | | | |
|---|---|---|---|
| 3,888,403 | 6/1975 | Yoshida et al. | 342/209 |
| 4,136,366 | 1/1979 | Ogira et al. | 360/96.4 |
| 4,359,761 | 11/1982 | Papst | 360/96.3 |
| 4,366,516 | 12/1982 | Ogata et al. | 360/130.24 |
| 4,429,336 | 1/1984 | Berube et al. | 360/97 |
| 4,445,159 | 4/1984 | Nemoto et al. | 360/137 |
| 4,539,612 | 9/1985 | Sidhu et al. | 360/99.05 |
| 4,553,183 | 11/1985 | Brown et al. | 360/98 |
| 4,562,496 | 12/1985 | Saito et al. | 360/85 |

FOREIGN PATENT DOCUMENTS

| | | |
|---|---|---|
| 0069545 | 1/1983 | European Pat. Off. . |
| 3314079 | 4/1982 | Fed. Rep. of Germany . |
| 58-159201 | 9/1983 | Japan . |

OTHER PUBLICATIONS

"Swartz," Motor In Spindle Gives Micro-Winchester Room for 140M bytes, *Mini-MicroSystems*, Feb. 1983.

*Primary Examiner*—David J. Severin
*Attorney, Agent, or Firm*—Fitch, Even, Tabin & Flannery

[57] ABSTRACT

The present invention relates to an integrated driving system for signal-processing devices, especially video devices (recorders) and other, preferably magnetic pulse recording devices, wherein the device chassis (1) and the mounting provision for at least two motors (20, 21, 22) are formed integrally with each other. The device chassis (1) proper also includes all mounting or bearing bores (e.g. 2, 50, 55) for all mounting shafts (e.g. 4, 8, 18) in a precise positional relation to each other. The bores (2, 50, 55) for all mounting shafts (4, 8, 18) and axles are formed in the metal-cast device chassis (1) in one or more machining operations without the necessity or re-chucking, ensuring that not only the active and passive driving sections of the driving system, but also the reference surfaces and bearing or supporting points are precisely positioned relative to each other.

17 Claims, 12 Drawing Sheets

INTEGRATED DRIVING SYSTEM FOR SIGNAL-PROCESSING DEVICES

This application is a continuation of application Ser. No. 942,834 filed Dec. 17, 1986 now abandoned, which is a CIP of Ser. No. 733,218 filed May 10, 1985, now abandoned, which is a CIP Ser. No. 684,460 filed Dec. 21, 1984, now abandoned.

The present invention relates to an integrated driving system for signal-processing devices, especially video devices (recorders) and other, preferably magnetic pulse recording devices, comprising a device chassis, at least one motor including a motor flange having bearing or guiding faces, bores for mounting shafts and/or auxiliary parts, for the precise moving or supporting of device components.

In devices of this type, the information carriers as such and also the recording and pickup sensors (readout heads) must be moved in a highly exact manner and, therefore, guided with high precision. For example, in video recorder devices and other devices, such as magnetic pulse recording devices, the drive shafts for the tape guides of cassette magnetic tapes and for magnetic discs must be aligned with each other with an extremely high degree of precision, this being due to the high density of information recorded in the recording medium (tape, disc). For example, values in the order of microns are required for the parallelism of shafts and the angularity of disc supporting planes. Under certain circumstances, this applies also to the cassette supporting or abutting planes, but only when such planes are used at the same time as the machining reference surfaces. Particularly the main drive shafts of video recorders and other magnetic pulse recording devices must meet extremely high requirements as far as concentricity of the shafts in their mounting or bearing system is concerned, and errors caused by tumbling (eccentricity) of the shafts must not exceed 5/10,000 mm.

It is therefore the object of the present invention to provide an integrated driving system for signal-processing devices of the type as outlined above, which system provides for a particularly accurate relative positioning of its components with a minimum of structural expenditure.

In an integrated driving system for signal-processing devices, especially video devices (recorders) and other pulse recording devices, according to the present invention this object is solved in that the chassis and the mounting portion are formed integrally with each other in one component, and that the bores for all mounting shafts and/or axles and/or the guideways are adapted to be formed in one machining step (e.g. in one production step without re-chucking of the workpiece).

The chassis of the device and the mounting portion for the motor, especially the motor flange, are preferably cast from a metal or injection molded, cast or compression molded from plastics material.

Thus, in the integrated driving system according to the invention, the chassis and the motor flange are formed integrally so that they may be processed or machined jointly. If more than one motor is required for the driving system, the motor flanges of all motors are likewise formed integrally with the chassis.

In re-machining the bores for all of the mounting shafts and axles, as molded in the chassis, the chassis need not be re-chuked, and this results in, on the one hand, exact positioning of the various bores relative to each other, and, on the other hand, in reduction of cost because subsequent adjustment is not required.

The integration of the motor flanges in the chassis provides for machining tolerances better than the sum of the tolerances of the individual workpieces or components. It is also this smaller "sum or net tolerance" which can be maintained substantially easier in the integrated driving system, that permits reduced cost; i.e. a favorable expense-to-effect ratio can be obtained.

As is well known, in video devices (recorders) the shaft of a head drum and the tape returning pins in the vicinity of the head drum must be positioned relative to each other under a highly precisely defined angle and with tolerances smaller than 10 minutes (of angle). Owing to the common processing or machining of a reference surface (or locus) for machining defined on the chassis, such tolerances can be maintained in a relatively easy manner. The points defining the reference plane may at the same time serve as abutting (rest) points or positions for the cassette.

Also, the integrated driving system according to the invention permits the setting of a head actuating shaft in a position exactly parallel with respect to a disc axis, or to define in a disc memory apparatus the voice coil guiding edges, generally perpendicular to the disc axis, in an inexpensive and precise manner in that these elements—during the above-mentioned common machining—are set directly in the chassis, preferably machined directly by milling.

A further embodiment of the invention resides in that by means of a configuration and material selection of the chassis, on the one hand, and of the parts or components mounted on the chassis, on the other hand, the temperature response, i.e. the thermal expansion of the various components, may be compensated for. In this manner, there is provided an integrated driving system for video devices and other magnetic pulse recording devices, which is substantially not affected by temperature variations of its environments.

Thus, the chassis of the device forms the support of all active and passive driving sections or components, for additionally required auxiliary parts, and optionally also for control electronics.

As indicated above, the chassis of the device may be formed of metal or plastic. A preferred metal is aluminum. Now, it has been found that in the case of a chassis formed of aluminum, temperature effects may result in a variation of bearing faces, which may exhibit itself in a so-called "tilting" of, for example, the axis of rotation of a motor relative to a planar bearing surface for discs, i.e. in a variation of the perpendicularity between the axis of rotation of a disc stacking hub and the bearing surface of the hard discs on said hub. Such temperature effects may be caused by significant variations of the ambient temperature, or may be the result of causes in the interior of the device and specifically in the interior of a bearing if, for example, the outer bearing race has a thermal expansion coefficient greatly different from that of the material of the device chassis (e.g. aluminum). Now, in order to eliminate such negative temperature effects, and particularly to ensure that the bearing surface for the disc stack shows at its edge a difference not greater than 5 $\mu$m (microns) (based on a diameter of the hub of 40 mm) with respect to the plane extending through the center of the bearing surface and being exactly perpendicular to the axis of rotation, even under temperature variations of 60° C., according to a particularly advantageous further embodiment of the invention it is contemplated that the motor is mounted to the mounting portion through a sleeve (or collar) connected to the bearing faces and preferably formed of steel, such mounting being effected preferably by means of adhesive bonding.

The adhesive film comprises a highly viscous, anaerobic liquid and has a thickness of from 2 to 30 μm, preferably from 2 to 20 μm; this means that the adhesive film is formed to be as thin as possible.

It is of decisive importance that the adhesive film is disposed within a highly precisely formed cylindrical bore (hole), namely on the bearing face of the mounting portion formed to be integral with the chassis of the device, because it is only in such a case that this film can be formed to be sufficiently thin. More particularly, a greater thickness of the adhesive film also would affect the stability and precision of the position of the disc stack in the device.

In order to extend the surface area for the adhesive film, the motor may be received, at least in part, in a trough provided in the chassis. In this manner, a low structural height can be secured in spite of this arrangement.

In order to keep the total height as low as possible, the power or capacity of the motor may be increased by using as the motor magnet, a plastic-bonded SmCo magnet, in which instance the signal magnet, axially adjoining the motor magnet on its lower side, may be a plastic-bonded ferrite ring or annulus. However, in the case of plastic-bonded Rare Earth magnets (such as SmCo) it is not possible to form rings with a long axial length. Accordingly, it is preferable to stack short rings in any desired manner. Then, the rings must be magnetized prior to assembling irrespective of their position, if magnetization in the assembled state is to be avoided. Such a premagnetization necessitates that the rings assume an exact circumferential position relative to each other in order that their polarities do not interfere with each other. To this end, axial grooves and keys are provided in one position on the circumference of each ring. A similar axial groove or key may be formed—if premagnetization is to be avoided—also in the underlying signal magnet ring because the latter, too, must be disposed in a correct circumferential position for the magnetization of the rotor.

The mounting portion may be provided with bearing and/or guiding faces for several motors. Likewise, motors for, e.g., three and six discs may be housed in sleeves or collars.

In the following, the invention is explained in greater detail with reference to the drawings, wherein.

Figure 1:
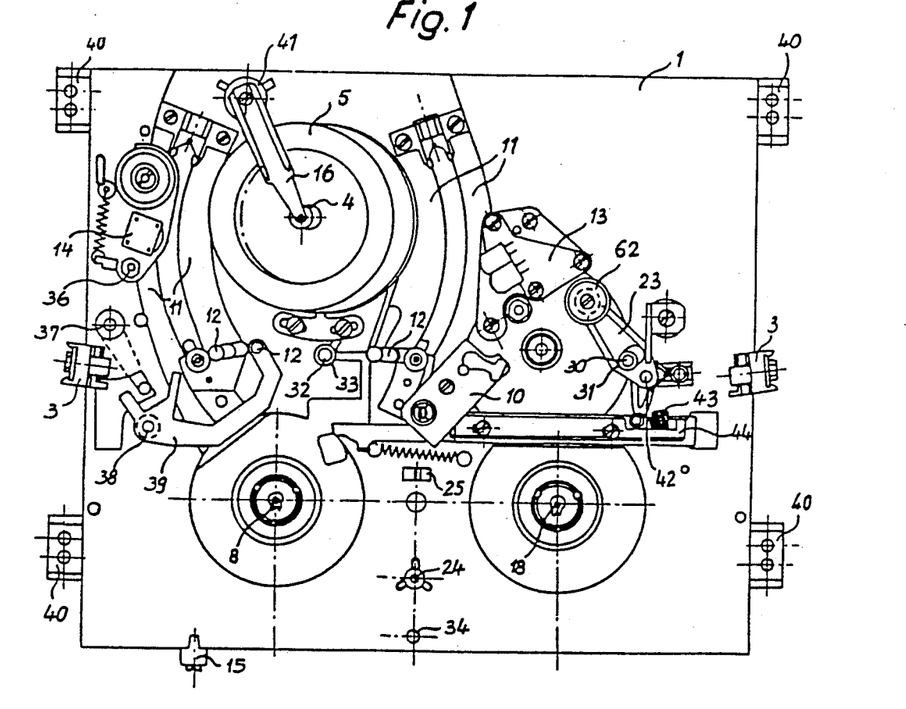
FIG. 1 is a plan view of an integrated driving system for a video pulse recording device.
Figure 2:
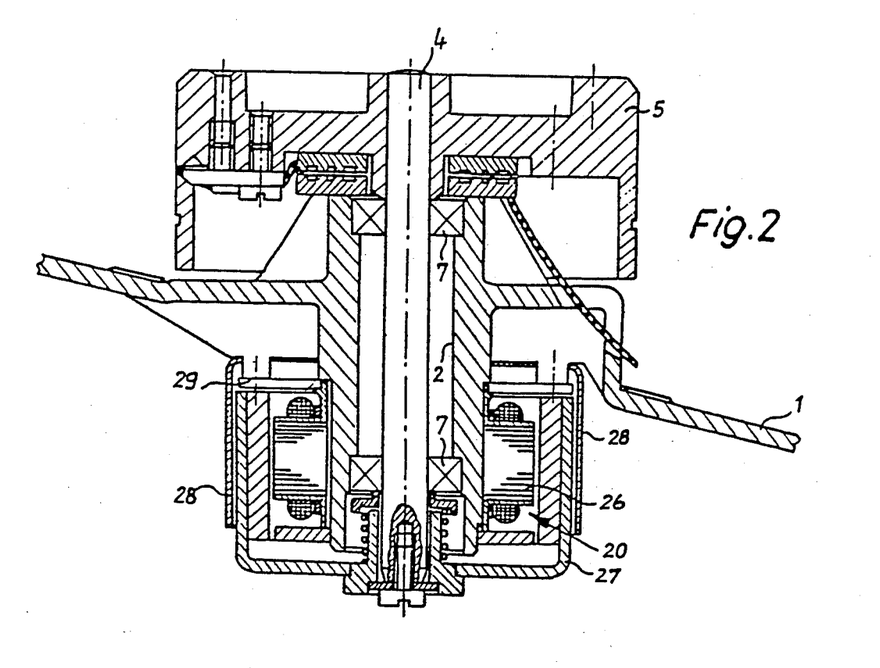
FIG. 2 is a sectional view of an inclined (skew) head drum drive in the driving system shown in FIG. 1.
Figure 3:
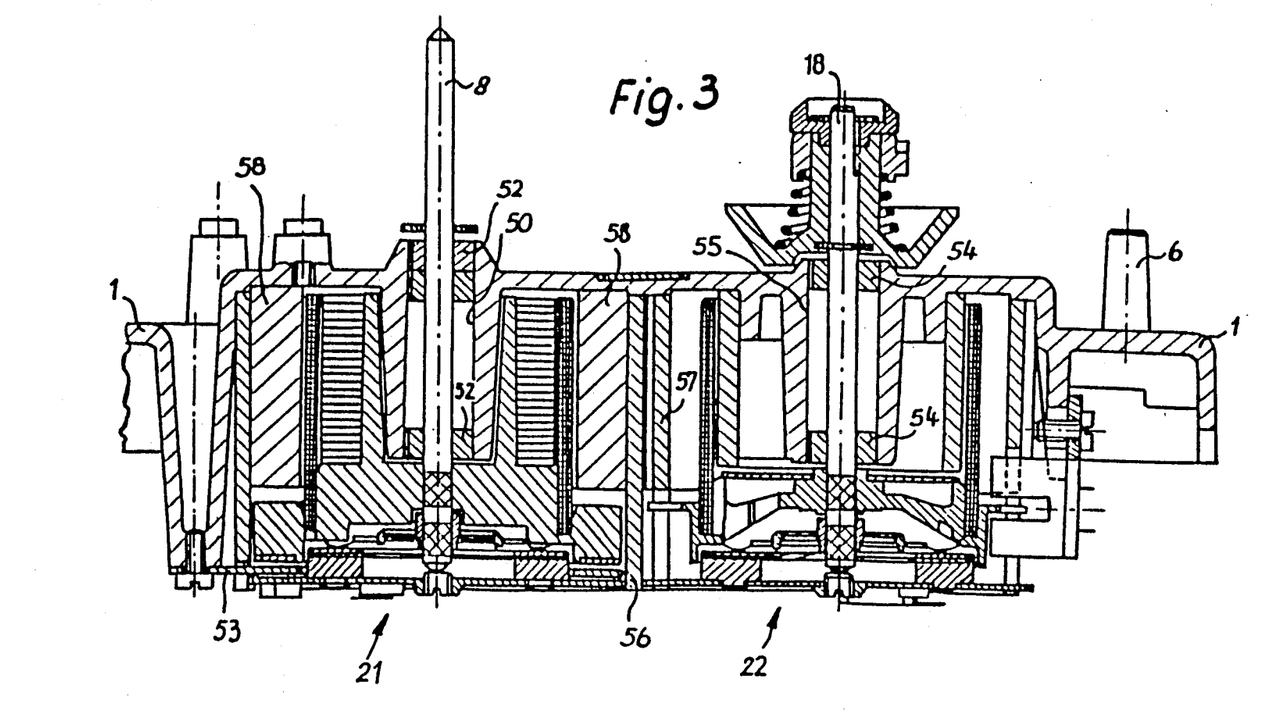
FIG. 3 is a sectional view of a capstan motor and a winding motor constructed in integrated technique, in the video drive mechanism according to FIG. 1.

FIG. 1 shows in plan view a video drive mechanism including an integrated driving system, i.e. a device chassis 1 acting at the same time as a motor flange for a head drum motor 20 (see FIG. 2) and a capstan motor 21 as well as a winding motor 22 (see FIG. 3). Generally, this integrated driving system includes as active drive sections, a magnetic head drum (wheel) 5 driven through the head drum motor 20 via a head drum shaft 4 and having an inclined (skew) axis, a capstan (shaft) 8 driven by the capstan motor 21, and a winding motor shaft 18 driven by the winding motor 22.

Passive drive sections are a pressure (or capstan) roller 62 which is mounted for pivotal movement about a shaft or axis 42 on a pressure roller lever 23, the stop position of which is determined by an abutting point 31 of a stationary pin 30, as well as returning pins 12 for changing the tape travel direction.

Further mounted directly to the chassis 1 are a holder and illumination means 10, a light barrier mounted on an integrally cast or molded pin 3, an audio (magnetic) head 13 and an erasing head 14. A recording prevention means 15 is secured by a screw in a slot of the cast or molded chassis 1.

Further attached to the chassis 1 are mounting lugs 40 and a holder or support 41 for a grounding yoke 16.

The head drum 5 is surrounded by reference surfaces 11 for the tape guide and threading carriages (or slides), respectively, which are defined by the chassis 1 and which are processed or machined together with the abutting point 31 of pin 30, an abutting point 33 of a pin 32, and an abutting point 34, and which are set in a precisely adjusted relation relative to each other.

In the same manner as the shafts 4, 8, 18, the pins 30, 32, another pin 36 for the erasing head bracket as well as shafts 37, 38 for a tape tension lever 39 and a shaft 42 for the pressure (roller) lever 23 are positioned in the chassis 1. The same applies to the tape guide axle 47 or the pin 36, respectively, which has additionally provided thereon a tape guide element. A control lever 44 including a spring 43 controls the pressure lever 23.

Cast or molded integrally with the chassis 1 are further a cable guiding or mounting element 25 and an auxiliary pin 24 for the cassette release mechanisms, which elements, however, are of secondary importance with respect to tolerances.

FIG. 2 is a sectional view of the head drum 5 disposed in an inclined (skew) position relative to the upper side of the chassis 1, which head drum is mounted for rotation in a longitudinal bore 2 of the chassis 1 through the bearings 7. The longitudinal bore 2 is formed to be precisely aligned and to have its skew set exactly relative to the cassette supporting plane defined by the abutting points 31, 33 and 34. The head drum motor 20 as such includes a stator section 26, a rotor section 27 and shield 28 for shielding electromagnetic fields. Further, the head drum motor 20 rests on the chassis 1 through a precisely machined and optionally integrated support 29 for the motor conductor (circuit) plate and a tachometer.

Finally, FIG. 3 is a sectional view of the capstan motor 21 and the winding motor 22.

The shaft 8 of the capstan motor 21 is mounted for rotation in a bore 50 of the chassis 1 through bearings 52. A capstan tachometer 53 is disposed with a close angular tolerance with respect to this mounting bore 50.

The axle or shaft 18 of the winding motor 22 is mounted for rotation in a bore 55 of the chassis 1 through bearings 54.

The motors 21 and 22 are each enclosed by a motor housing 56, 57, with the motor housing 56 providing a return path for magnets 58.

Accordingly, in the integrated driving system according to the invention, the chassis 1 of the device and the motor flanges of all motors 20, 21, 22 are formed with an integrated or one-piece construction. Further, all bores (compare, for example, bore 2 of FIG. 2, and bores 50, 55 of FIG. 3) for all of the mounting shafts or axles, or shafts to be inserted, are formed without the necessity of re-chucking in a machine tool in such a manner that these bores are positioned relative to each other with an extremely high degree of precision. The same applies particularly also to the inclined (skew) bore 2 for the head drum 5. Also, such auxiliary parts as, for example, a holder for the illumination means 10, which are necessary for the operation of the device, are cast or molded and machined, respectively, together with the chassis 1. This common machining applies also to the reference surfaces 11 and the various abutting (or stop) points which must be positioned relative to each other with a precisely defined relationship.

Figure 4A:
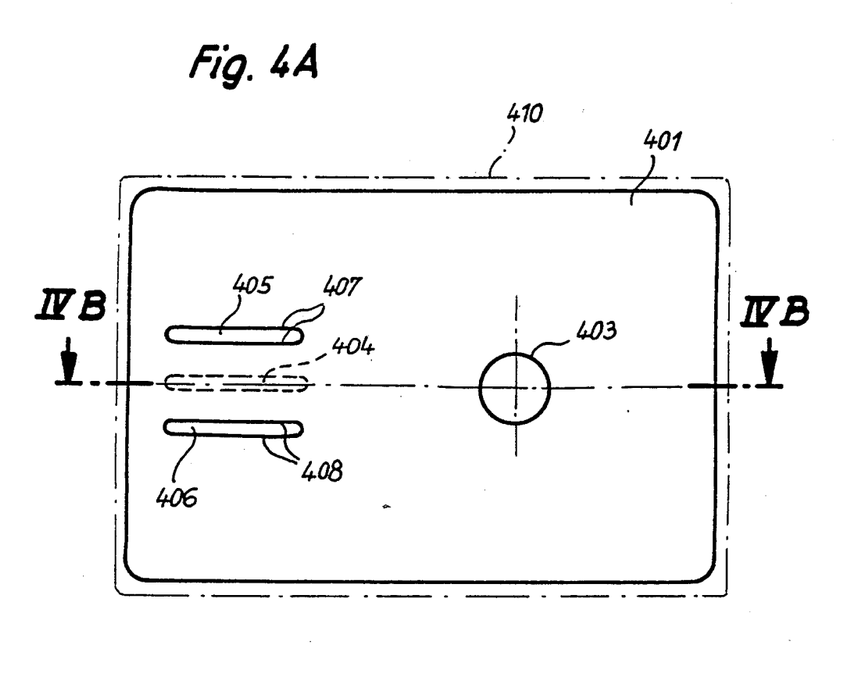
FIGS. 4A and 4B are a plan view (FIG. 4A) and a sectional view (FIG. 4B), respectively, of an embodiment of a hard disc memory comprising a motor and a pair of guide slots for the voice coil motors.
Figure 4B:
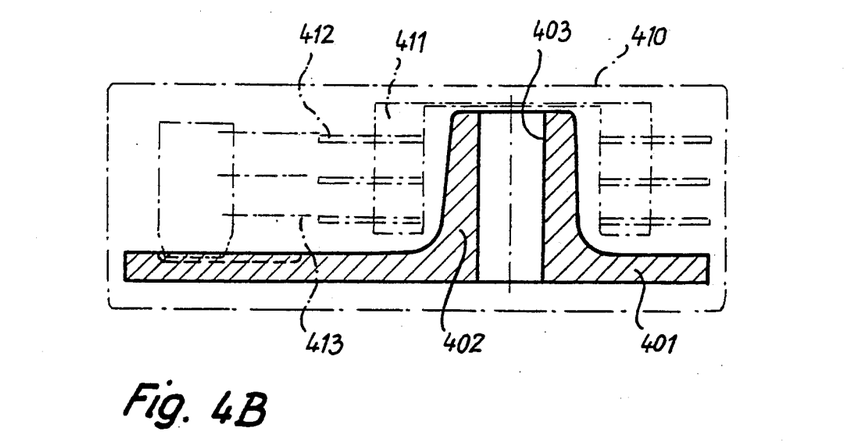

FIG. 4 shows in plan view (FIG. 4A) and in sectional view (FIG. 4B), respectively, an integrated driving system for hard disc memories. A chassis 401 of the device includes a mounting guide lug 402 protruding vertically from the chassis and being provided with a mounting bore 403. Indicated in dash-dot lines are the external dimensions of a hard disc memory apparatus 410. A hub 411 supports memory discs 412. Scanning heads 413, likewise shown in dash-dot lines, are moved (driven) by voice coil motors (not illustrated) which are guided in a slot 404 or in a plurality of slots 405, 406 at the lateral faces 407, 408 thereof. The slots 404, 405, 406 are machined jointly with the mounting bore 403 in a single chucking (or clamping) step, and these portions are therefore given precisely defined relative positions. The slot 404 (shown in broken lines) constitutes an alternative to the pair of slots 405, 406.

Slots 405, 406 extend with a predetermined spacing from each other and in parallel with each other and in concentric relation to the mounting bore 403, when considering the plane according to FIG. 4A; whereas in the alternative example including one single guide slot 404 (shown in broken lines), this slot extends substantially in the direction of the mounting bore axis.

Accordingly, the chassis 1 or 401 constitutes the support or carrier for the entirety of the active and passive driving sections and for additionally required auxiliary parts, and the chassis 1 may further receive control electronics (not illustrated), if necessary.

Figure 5:
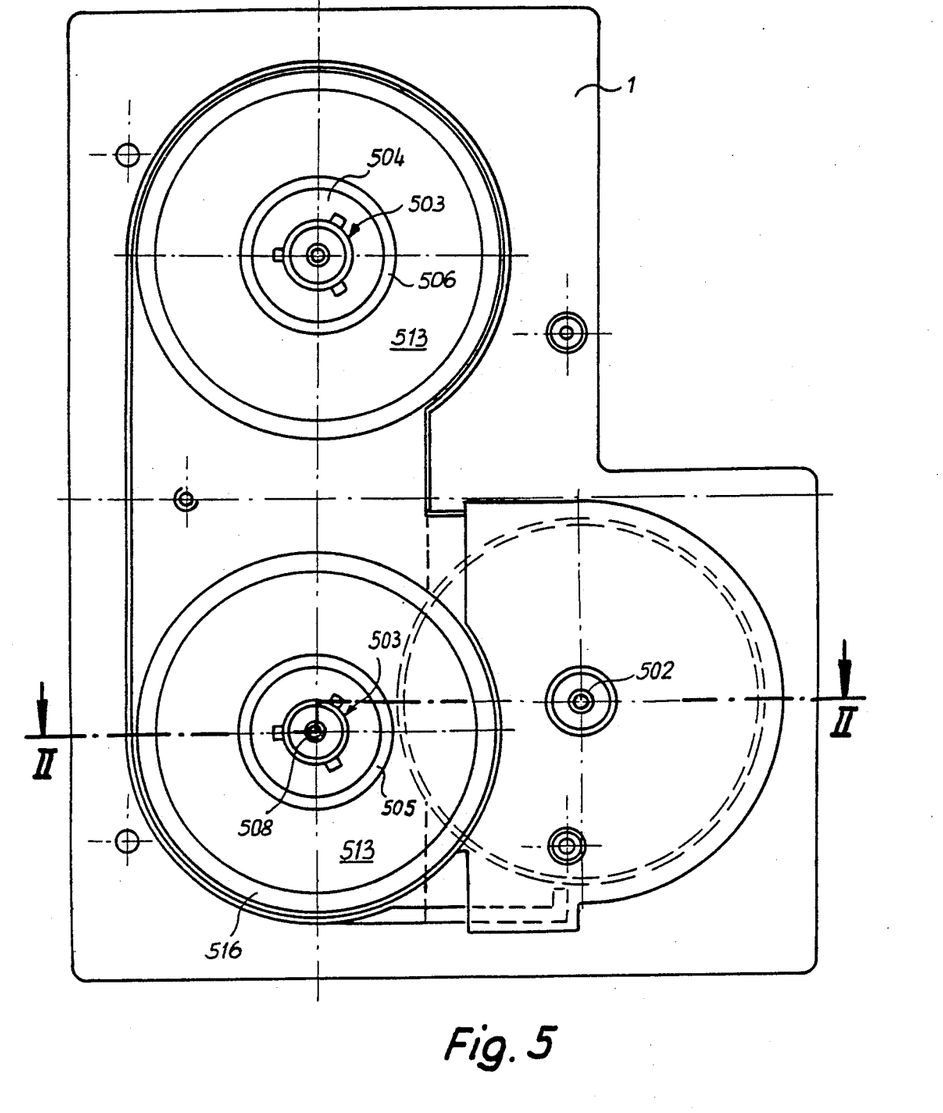
FIGS. 5 and 6 are a plan view and a sectional view, respectively, of a chassis of the device with directly integrated bearing seats.
Figure 6:
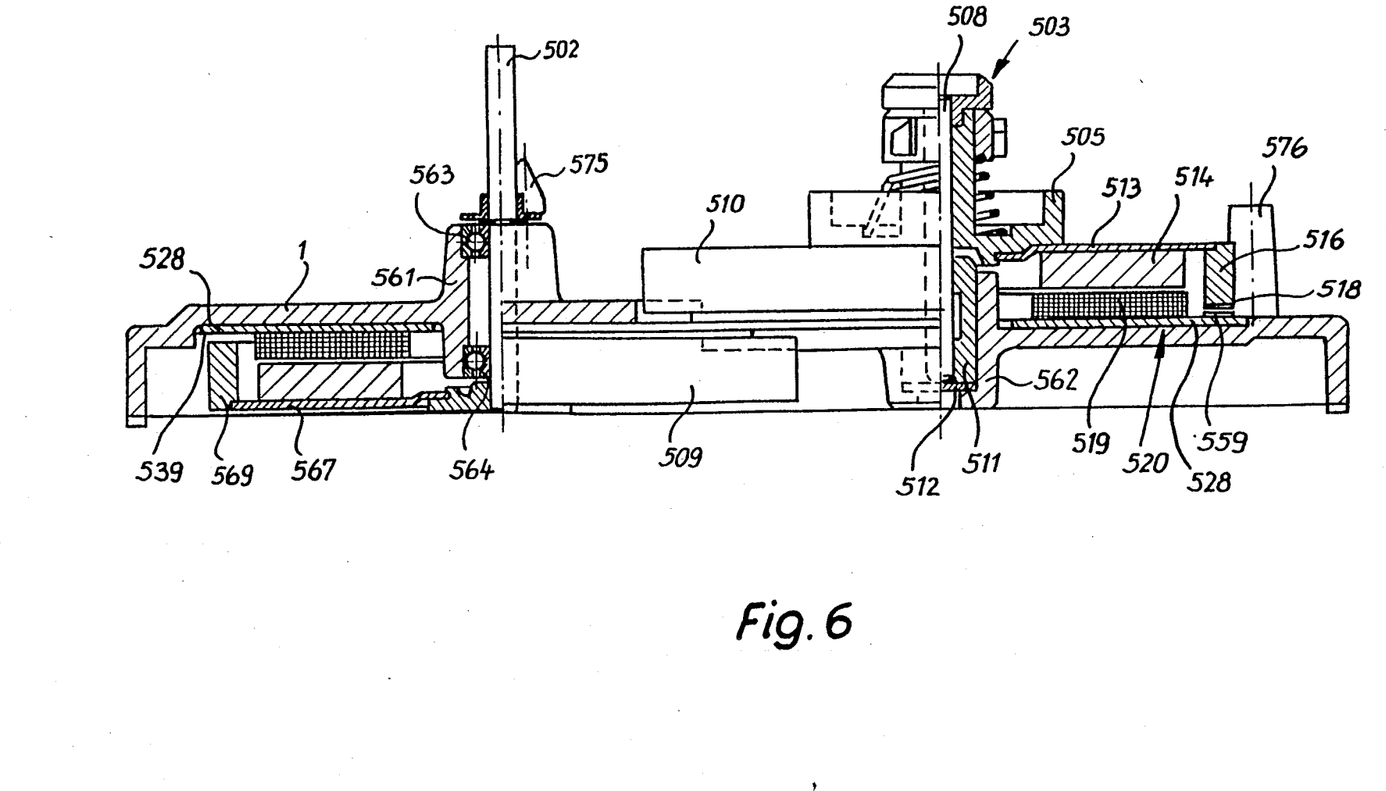

FIGS. 5 and 6 illustrate a chassis housing 1, a capstan (shaft) 502, and winding spindles 503, 504 including winding reels 505 and 506, respectively. Here, the winding reels or spindles, respectively, are provided with a rotating shaft 508 which is rotatable in a friction bearing unit 511 and additionally supported in axial direction in a thrust bearing 512 (of course, a reversed arrangement is also possible, such that an upright shaft receives the rotating winding spindles and winding reels). The winding spindles and reels are designed in standardized, normal construction for a standard video tape cassette.

On the lower portion of the winding reel 505, the soft magnetic return disc 513 of the rotor is integrally formed or molded, or at least held with positive engagement, with an S-shaped cross-sectional profile. An axially magnetized permanent magnet 514 is attached to a substantially planar annular return disc portion 513. The thickened rim 516 of the winding motor embraces in bell-type fashion the permanent magnetic rotor and also the stator-side coils in the axial direction, thereby defining a small air (or flux) gap 518. An air gap 519 of the winding motor is limited, on the opposite side of the permanent magnet 514, by a planar or flat coil set 520 including separate coils 521 to 526. These coils are placed on the upper side 529 of a board or plate 528; in this position, these coils are provided on a printed circuit 531, 532, 533 shown in FIG. 5, to which the separate coils are soldered. The six coils 521 to 526 are driven in three-phase fashion; three Hall generators 541, 542, 543 are soldered (connected by soldering) to the conductor or circuit plate 528, namely in a printed circuit layer 530 which is applied directly to the surface 529 of board or plate 528. The six equidistant coils are of a trapezoidal shape. Opposing the six coils are four rotor poles. This three-phase motor assembly is useful to provide more power. If less power and less uniformity of torque can be tolerated, it is also possible to use a four-coil assembly, as is known per se. However, this may mean that not only the uniformity of torque is reduced (impaired), but also the radial dimension of the stator winding assembly increases with identical power requirement. The support (circuit) board or plate 528 has a soft magnetic core and is coated on both surfaces thereof. Shown at the left in FIG. 6 is the integral deck of the right hand half of the Figure, and a printed circuit board is provided on the underside 539 thereof. The motor, designed as a three-phase motor, features six equidistant stator coils (or windings) of a trapezoidal shape; again, the three Hall generators in three adjacent coils are positioned in the center thereof. Thus, these coils 541 to 546 overlap, approximately in the center part of FIG. 6, the coils 551 to 556 on the lower side of the capstan motor as well as the winding motor coils 521 to 526 on the upper side of board 528. Again, the Hall generators 544, 545, 546 are displaced by 120 electric degrees such that a constant torque is obtained particularly in the capstan motor. According to the invention, the bearing pipes or studs 561 for the capstan drive means are formed integrally with the housing chassis 1, with the shaft 502 of said drive means being mounted for rotation in ball bearings 563, 564, while the winding shaft 508 at the right side is mounted for rotation in a sintered bearing 511 having a pair of sliding (friction) faces, and this friction bearing component 511 is inserted as a sintered integral part into the bearing pipe or stud 562 which is integrally joined to the housing chassis 1. In the design according to FIG. 6, stiffness of the assembly is provided primarily by the housing chassis 1. With respect to stators 521 to 526 and 551 to 556 (separate coils each) the continuous board (or plate) 528 acts as non-rotating magnetic return path, whereas the rotating return path is defined by the disc 513 or 567, respectively, in its axial position which defines the maximum axial thickness of the drive set. Preferably, on the capstan (shaft) the motor is positioned below the board or plate, in which instance then, necessarily, the drive motors must be positioned above board or plate 528. This has the consequence that in the region of the capstan (shaft) 502 the heads which are sensitive to leakage fields, are shielded from leakage fields (emitted) from the stator winding 551 to 556 by the soft magnetic board or plate 528. Further illustrated at the right side of shaft 502 is an arresting pin 575, and a corresponding pin 576 for retaining the cassette is provided at the right hand end of FIG. 6.

As shown in FIG. 6, the bearing pipe 561 of the capstan (shaft) 502 is extended in upward direction so that the spacing between the two ball bearings 563, 564 becomes maximum. This is advantageous for the reason that transverse load acting on the end of shaft 502 in operation constitutes a considerable force. Considering the other details (installation space and standardized dimensions), the spacing of bearings 563, 564 in axial direction would be smaller if the motor including the rotor 510 were positioned above the board or plate 528. Furthermore, as indicated above, owing to this arrangement leakage fields in the vicinity of the end of capstan (shaft) 502 where the heads are positioned, too, are smaller (weaker) when the stator coils are disposed below board or plate 528 (in combination with the rotating magnets). A Hall generator 529 (559) is positioned on the periphery of portion 516 which comprises a permanent magnet ring having 36 or 48 poles which are axially magnetized and the magnetic field or flux of which acts upon the Hall generator 559. The ring or annulus 569 which constitutes the rotating case of the capstan motor when assembled with the plate 573 in shell-like fashion, also may be formed as such a permanent magnet so as to act upon a correspondingly positioned Hall generator, as is shown at 559 at the right hand side of the Figure. Counting or rotation signals for controlling or measuring (detecting) the tape coils or the revolutions may be obtained from the pulses of this Hall generator.

Figure 7:
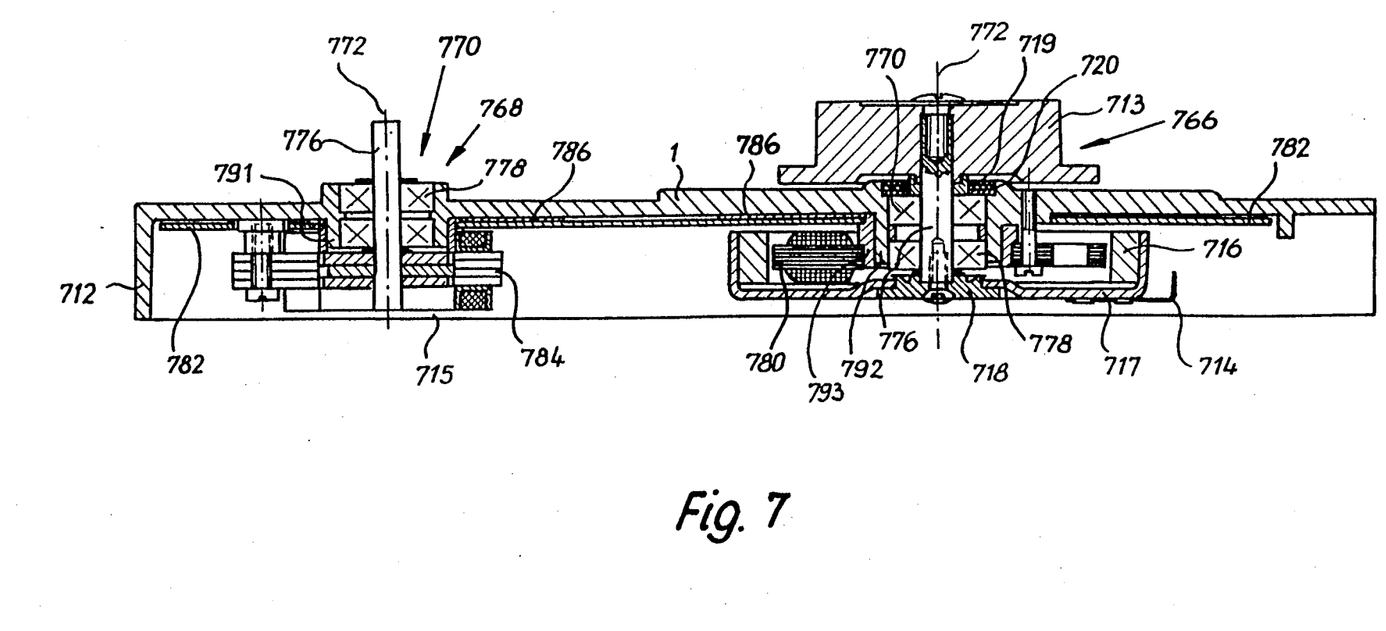
FIG. 7 shows another embodiment of the invention, including a disc memory motor with a suspended outside-rotor bell (or socket) and a voice coil motor.
Figure 8:
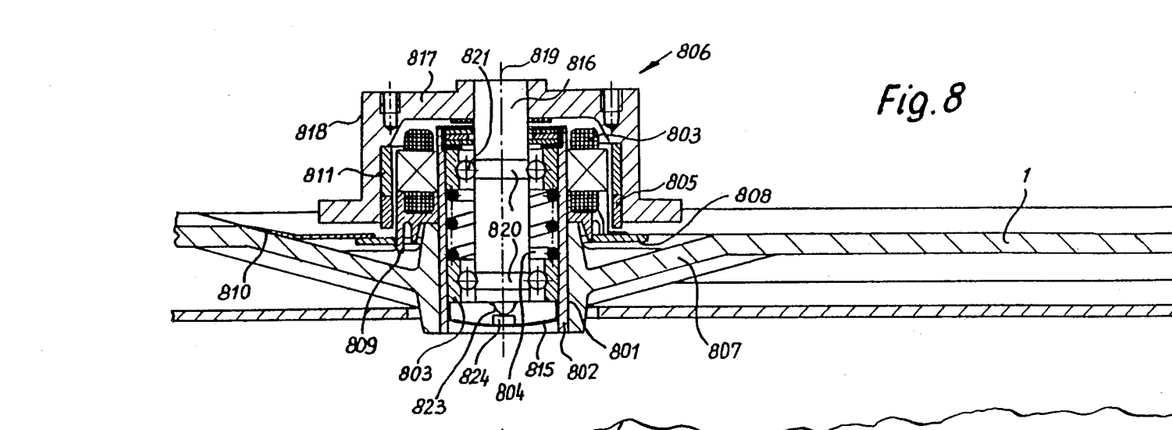
FIGS. 8 and 9 and FIGS. 10 and 11, respectively, each illustrate an embodiment of the invention including a steel sleeve adhesively bonded to guiding faces.
Figure 9:
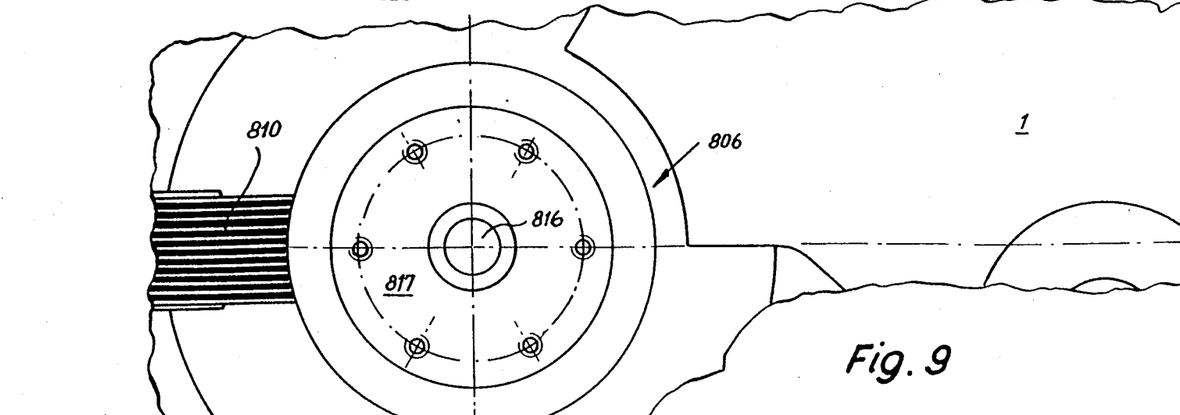
Figure 10:
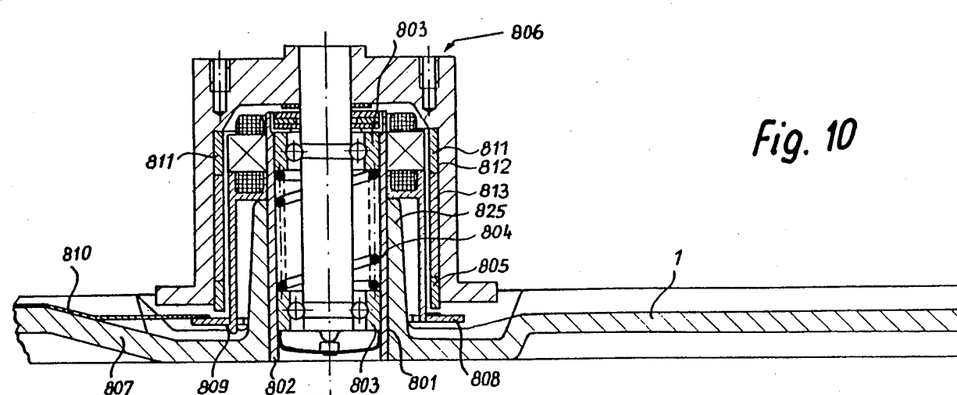
Figure 11:
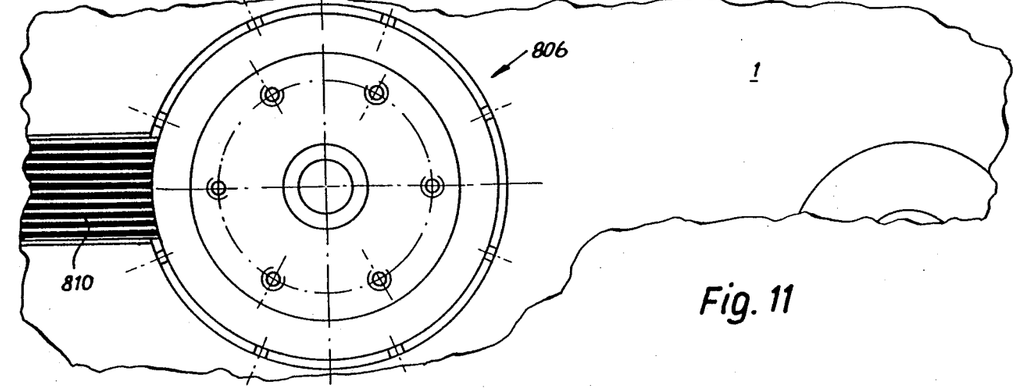

FIG. 7 illustrates a further embodiment of the invention for a hard disc memory including a voice coil motor 768 and a disc (drive) motor 766. In these motors, a pair of shafts 776 of a diameter of e.g. 5 mm are mounted for rotation in such a manner that their axes 772 are exactly in parallel with each other. To this end, a pair of bearings 770, each consisting of identical ball bearings 778, are attached to corresponding bearing faces of the housing chassis 1. Motor 766 comprises a stator 780, while motor 768 comprises a stator 784. Both stators 780 and 784 are mounted to a circuit board 782 which further serves to mount Hall elements, for example. The one stator is fixed to the circuit board 782, while the other stator is slidably attached thereto with a minimum clearance for tolerance compensation. A metallic shield ring 786 is provided around each stator 780 and 784, respectively, between the respective stator and the housing chassis 1.

Preferably, the conductor or circuit board 782 is releasably mounted to the housing chassis 1. The position of the stator 784 of the voice coil motor 768 may be adjusted in the bearing by means of, for example, a plug or pin (not illustrated), while the rotor of the disc motor 766 may be secured in its position by means of (a) screw(s) with the intermediate of a conductive adhesive.

In a further embodiment according to FIG. 7, there is again illustrated a chassis plate which extends substantially in a single plane (and) which has integrally molded thereon a pair of cylindrical bosses. In this signal-processing apparatus, being a hard disc memory, it is also essential to cause the discs, positioned around the so-called hub motor 766, in a highly precise position which remains constant for the whole service life of the device, whereas the left-hand voice coil motor 768 must control or perform an exact movement radial to the axis of the motor 766, because a high track density on the memory discs rotating about the axis of motor 766 requires a highly exact radial position of the read-out or scanning heads (as indicated, controlled and moved by motor 768). Bearing pipe-like, hollow cylindrical portions 791 and 792 are, as mentioned, machined (according to claim 1) integrally with the chassis plate 1 and (both bearings) in one machining step. Accordingly, shafts 776 or axes 772 respectively, are positioned relative to each other as exactly as possible. This constitutes the primary requirement. Naturally, it is expedient to this purpose that the rotors are properly mounted for rotation and balanced so as to rotate about these axes without inducing vibration. The respective stators are each, so to speak, mated with these axes by assembling them with sufficient precision in such a manner that the prescribed air (or flux) gap spacings between the stators and rotors are maintained. The stator of motor 766 is placed on the bearing pipe or stud boss 792 relatively exactly (by forming, for example, also an outer seating face 793 in the same machining operation). Thus, the precision of the stator of the hub motor must be relatively high, because this stator is subject to stricter air gap requirements.

Optionally, the stator of the voice coil motor 768 is re-adjusted in the above-described manner. The method of mounting by means of plugs (or pins) is relatively inaccurate, however. On the other hand, the inside-stator of the outside-rotor hub motor 766 may be mounted to the bearing pipe seat 793 relatively easily and precisely.

Positioned underneath the chassis plate 1, in axially very compact fashion, is the hub motor which has a diameter/length ratio of 5 to 10:1; i.e. the air gap diameter is equal to from five to ten times the axial length of the air gap or of the annular magnet, respectively. Being of approximately the same height, the voice coil motor is positioned within the extremely flat chassis 1 including the rim (or skirt) 712 which further extends beyond the axial length of the drive motors by a safety margin 715. Disposed above the plate is the so-called hub or plate hub 713 of the motor 766. It is evident that the outside-rotor motor with respect to this hub 713 also may be an inside-rotor motor or a so-called in-hub motor in which a rotating or even a so-called stationary shaft supports a motor which is arranged interiorly of the hub. The problems regarding the bearing seat precision are the same in such a case. A so-called in-hub motor is subject to the same strict tolerance specifications, and the in-hub motor can be formed substantially as an outside-rotor motor only; however, it may be provided with a rotating shaft or a stationary shaft. In the case of a stationary (or "standing") shaft, this shaft as such is fixed within a bore of the chassis plate 1 with the requisite precision. This solution is preferred because of the extreme radial limits or limits with respect to radial dimension (a standardized outer diameter of e.g. 40 mm or even 25.4 mm is prescribed for the outer hub diameter). This solution (i.e. structure) with the stationary shaft constitutes, as far as motor power or capacity is concerned, a more advantageous construction in connection with economical utilization of installation space.

In any case, this fixed, non-rotating (or even rotatable) shaft then must be positioned with corresponding exactness in the plate or relative to the plate seat or bearing surface. The hub motor features a steel yoke 714 which, as a ferromagnetic component, is attached to the outside rotor prior to the balancing thereof and which induces one pulse per revolution in an opposing, magnetic flux-responsive sensor. A permanent magnet ring or annulus 716 is, optionally also in (the form of) half or quarter shells, adhesively secured within an outside-rotor socket or bell 717 which is screwed or adhered to shaft 776 through an intermediate flange portion 718. By means of conductive adhesives or by current conducting ferro fluids in position 719 (magnetic seal 720 between shaft 776 and chassis 1), the bearing system is, on the one hand, sealed relative to the space containing the hub 713 and being subject to very strict requirements with respect to cleanliness, and, on the other hand, simultaneously grounded; that is, some conductive connection must be established between the rotor or the hub, respectively, and the chassis plate. If necessary, this solution may be realized in the bearing region by a metallic spring spirally surrounding the shaft 716 and sliding on the latter.

The magnetic seal 720 is, in axially interfitting relation, positioned interiorly of hub 713 in such a fashion that it resides within a small axial projection of plate 1, whereby the height of construction is not further increased.

FIGS. 8 and 9 or 10 and 11, respectively, illustrate two further embodiments of the invention for a hub motor, as shown in FIG. 7, wherein a bearing or mounting face 801 of the housing chassis 1 formed of aluminum has bonded thereto a steel sleeve 802 by means of a from 2 to 20 μm thick adhesive film of a highly viscous, anaerobically curing liquid adhesive. Disposed within the steel sleeve 802 are ball bearings 803 which are biased by means of a spring 804.

The difference between the exemplary embodiments according to FIGS. 8, 9 and FIGS. 10, 11 resides in that three or six plates, respectively, may be installed, while using the same motor and also the electronic system inclusive of a signal magnet 805 on the lower edge or rim of the outside-rotor bell 806.

In order to increase the bonding seat surface, in both embodiments the motor is seated in a trough (or depression) 807 of the device chassis 1. Similarly, in both embodiments a conductor or circuit board 808 which is fixed by snap fixing means 809, terminal leads 810 each illustrated as rotated by 90° in plan view and sectional view, as well as magnets 811 are each the same. In the embodiment according to FIGS. 10, 11, there is additionally provided a non-magnetic spacer ring 813 between the magnets 805 and 812, and in the right hand portion of FIG. 10, the (left) magnet ring 811 is replaced by a pair of axially bisected motor magnet rings 811, 812.

Owing to the common machining of the mounting holes, of the reference surfaces and, optionally, of the slots, a maximum of precision is obtained in easy manner, while simultaneously simplifying the structure of the driving system as the chassis and, for example, the motor flanges are formed integrally.

The trough 807, i.e. the depression, further increases the stiffness of the chassis plate 1. Furthermore, the bonding seat length is extended in axial direction (surface 801). Disposed on the upper edge of the steel sleeve 802 is a so-called magnetic seal (or barrier) which operates, in well known manner, with a magneto-liquid fluid. The shaft 816 is constantly fitted with high precision into the hub 817. The cylindrical outer surface 818 of hub 817 must be exactly coaxial to the axis 819. Formed in the shaft 816 are race grooves 820 for the balls 821 of the bearings. The shaft 816 acts as an inner race of the bearings. This structure is known per se. On its bottom end, shaft 819 is provided with a semisphere 823 the center of which (possibly also on the axis 819) abuts a small plastic block 824 in the manner of a one-point bearing. Electrostatic charge of the rotor is discharged via this one-point bearing surface to a resilient cap 815 which is retained in the steel sleeve 802. The depression (trough 807) extends the bonding seat surface 801 to at least one-half of the axial length of the steel sleeve, while preventing the hub 806 from extending higher above the chassis plate 1. In the case shown in FIG. 10, the extra bonding seat length for the higher hub (for a greater number of discs) is obtained in that the bearing pipe-like, integrally molded sleeve 825 is integrated, to extend upwards, in the construction interiorly of the hub.

FIGS. 12A–12D, 13 and 14 illustrate an embodiment of the invention that combines a hard disc drive motor 66 and a stepper or voice coil motor 68 in a cast frame. As may be seeen in the figures, two motor bearing sets have parallel axes 72 in a cast frame 74. Two shafts 76 are provided that may be, for example, 5 mm in diameter. The shafts are mounted in the bearing sets 70 which result in four identical ball bearings 78.

Figure 12A:
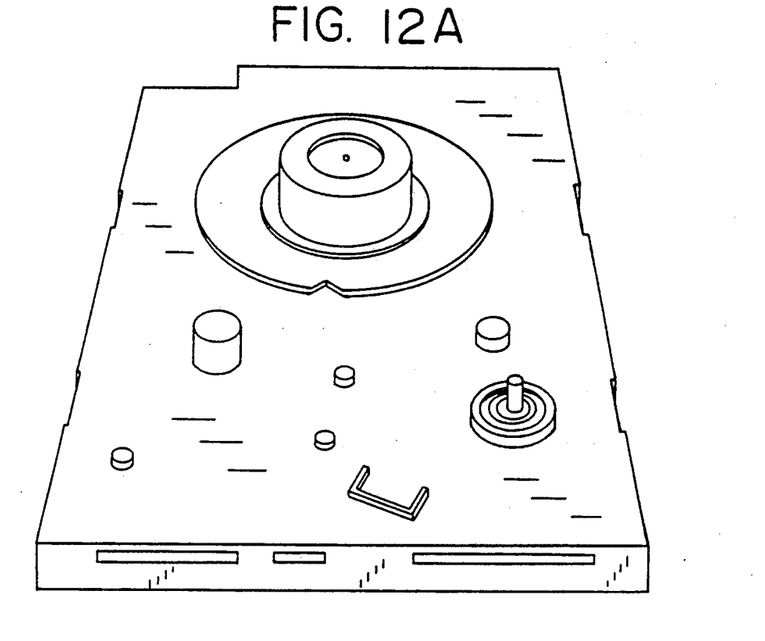
FIG. 12A is a photograph of an embodiment of the invention incorporating a hard disc motor and a stepper or voice coil motor combined in a cast frame.
Figure 12B:
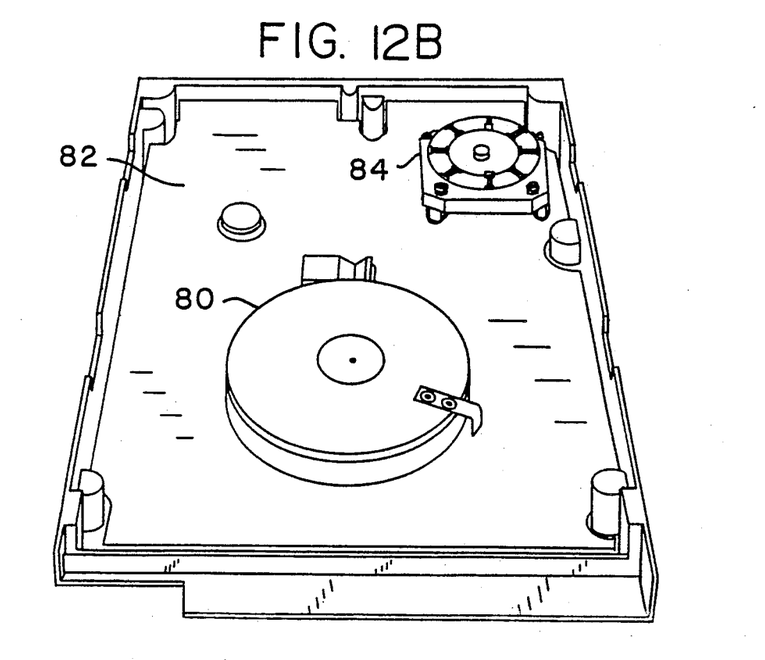
FIG. 12B is an open bottom view of the device shown in FIG. 12A.
Figure 12C:
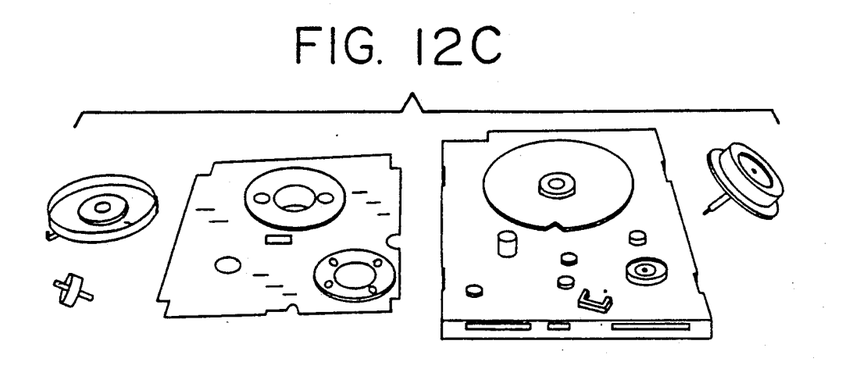
FIG. 12C is a photograph of the device of FIG. 12A in a disassembled form showing the top view of the various parts.
Figure 12D:
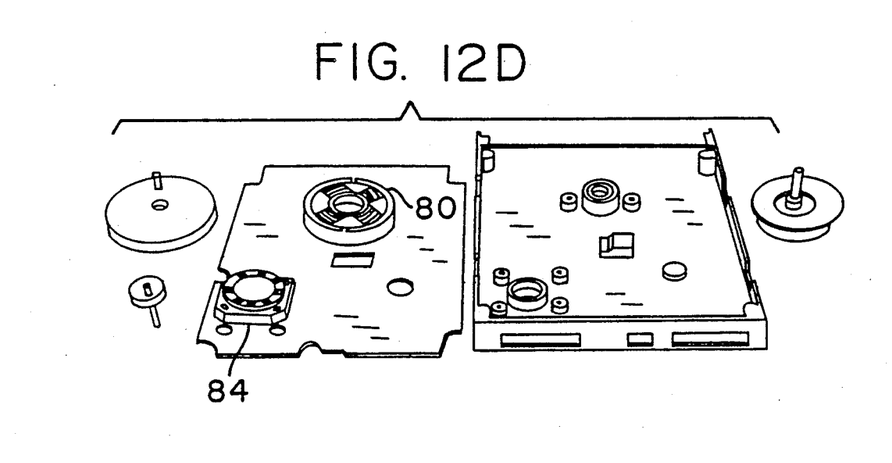
FIG. 12D is a bottom view of the various parts shown in FIG. 12C.
Figure 13:
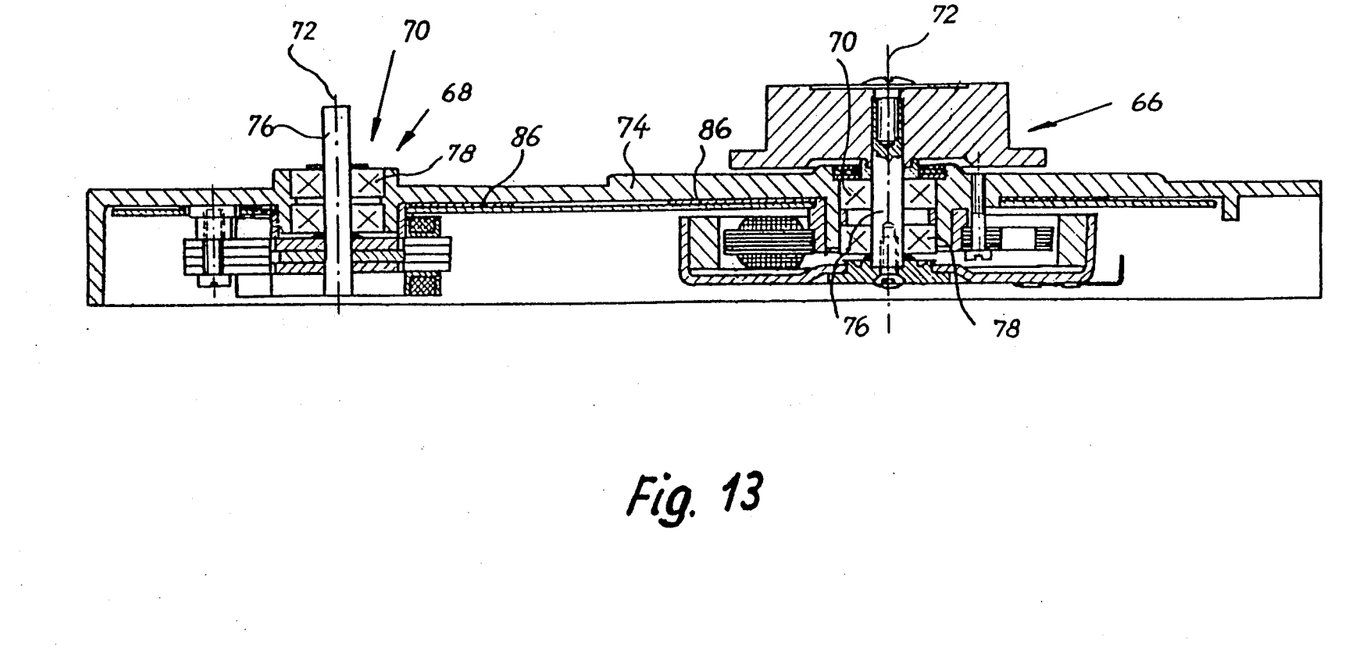
FIG. 13 is a drawing in section of the device depicted in FIG. 12A.
Figure 14:
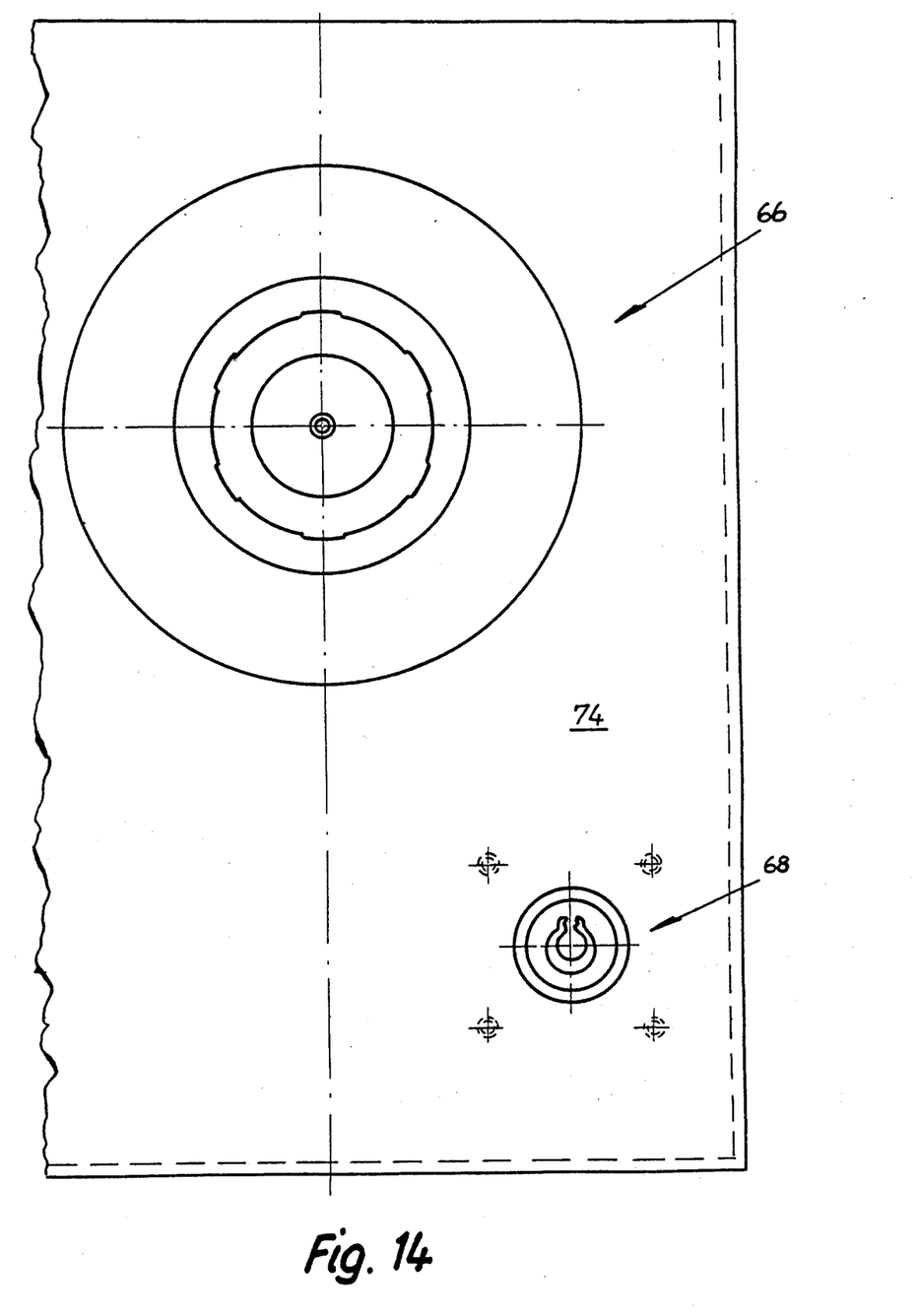
FIG. 14 is a plan view of the device shown in FIG. 13.

The disc motor 66 includes a stator 80 (best seen in FIG. 12B). This stator is stationary and is mounted on a printed circuit board 82. The stepper or voice coil motor 68 includes a stator 84, and it also is mounted on the printed circuit board 82. This can be mounted, however, for movement within limits for tolerance adjustments. A metal shield ring 86 (FIG. 13) is mounted between respective stators and the cast frame 74.

The printed circuit board 82 includes chips inserted therein, such as Hall-IC's, motor control elements, connectors and so forth.

The assembly of the stator plates are appropriately affixed to the cast frame, preferably in a manner allowing the removal of the printed circuit board from the frame. Means are provided for adjusting the position of the stepper motor stator via a mandrel (not shown) in the respective bearing set. The rotor for the disc motor may be screwed in position with conductive glue, that is glued in carbon ground lead, or it may be glued with a shaft cap.

Although the invention has been described in connection with preferred embodiments, alternatives, modifications, and variations may be apparent to those skilled in the art in view of the foregoing description. Accordingly, it is intended to embrace all such alternatives, modifications, and variations as fall within the spirit and scope of the appended claims.

We claim:

1. An integrated driving system for signal-processing devices, especially video and other pulse recording devices, comprising:
a device chassis formed of a metal and mounting active and passive drive elements including a plurality of motors, shafts, bearings and pins;
a cassette supporting plane defined by three reference points on the chassis;
a head drum mounting bore on and through the chassis, the head drum mounting bore having an axis that forms a specified angle with respect to the cassette supporting plane; and
a plurality of precisely positioned motor mounting flanges and a plurality of additional precisely positioned bores on and through the chassis receiving and mounting the shafts, bearings and pins of the active and passive drive elements,
the reference points, the bores, the motor mounting flanges and the chassis all being of a one-piece construction with integral portions of the chassis separating the precisely positioned bores, mounting flanges and reference points,
all bores, mounting flanges and reference points having been first formed with the chassis in a certain relationship to each other and thereafter having been precision machined in a single chucking step of the chassis in a machine tool to obtain a precisely adjusted relationship to each other, whereby these bores, flanges and reference points are positioned relative to each other with an extremely high degree of precision.

2. An integrated driving system for signal-processing devices, especially video and other pulse recording devices, comprising:
a device chassis formed of a metal and mounting active and passive drive elements including a plurality of motors, shafts, bearings and pins;
a cassette supporting plane defined by three reference points on the chassis;
a head drum mounting bore on and through the chassis;
at least one reference surface on the chassis adjacent the head drum mounting bore, the head drum mounting bore having an axis that forms a specified angle with respect to both the cassette supporting plane and the at least one reference surface; and
a plurality of precisely positioned motor mounting flanges and a plurality of additional precisely positioned bores on and through the chassis receiving and mounting the shafts, bearings and pins of the active and passive drive elements,
the reference points, the at least one reference surface, the bores, the motor mounting flanges and the chassis all being of a one-piece construction with integral portions of the chassis separating the precisely positioned bores, mounting flanges, reference points and the at least one reference surface,
all bores, surfaces, flanges and reference points having been first formed with the chassis in a certain relationship to each other and thereafter having been precision machined in a single chucking step of the chassis in a machine tool to obtain a precisely adjusted relationship to each other, whereby these bores, surfaces, flanges and reference points are positioned relative to each other with an extremely high degree of precision.

3. An integrated driving system for signal-processing devices, especially video and other pulse recording devices, comprising:
a device chassis formed of a metal and mounting active and passive drive elements including a plurality of motors, shafts, bearings and pins;
a plurality of precisely positioned motor mounting flanges and a plurality of precisely positioned bores on and through the chassis receiving and mounting the shafts, bearings and pins of the active and passive drive elements, the bores, the motor mounting flanges and the chassis all being of a one-piece construction with integral portions of the chassis separating the precisely positioned bores and mounting flanges,
all bores and mounting flanges having been first formed with the chassis in a certain relationship to each other and thereafter having been precision machined in a single chucking step of the chassis in a machine tool to obtain a precisely adjusted relationship to each other, whereby these bores and mounting flanges are positioned relative to each other with an extremely high degree of precision.

4. An integrated driving system according to claim 1, 2, or 3 for at least one scanning head of a hard disc memory, wherein at least one slot for guiding the scanning head and a mounting bore are formed in the device chassis during said single chucking step.

5. An integrated driving system according to claim 4, wherein a pair of mutually parallel slots are positioned with a predetermined spacing from each other and extend in concentric relation to the mounting bore associated with said scanning head and are formed in the device chassis during said single chucking step.

6. An integrated driving system according to claim 5, wherein other elements of secondary tolerance importance are formed integrally with the device chassis.

7. An integrated driving system according to claim 6, wherein the chassis further supports control electronics.

8. An integrated driving system according to claim 7, wherein the device chassis includes bearing and support faces for various motors.

9. An integrated driving system according to claim 8, wherein at least one of the motors is mounted on the chassis through a sleeve joined to the bearing faces.

10. An integrated driving system according to claim 9, wherein the sleeve is adhered to the bearing face by means of an adhesive film.

11. An integrated driving system according to claim 10, wherein the sleeve is formed of steel.

12. An integrated driving system according to claim 11, wherein the device chassis is formed of aluminum.

13. An integrated driving system according to claim 10, wherein the adhesive film is formed to be as thin as possible.

14. An integrated driving system according to claim 13, wherein the adhesive film has a thickness of from 2 to 30 μm.

15. An integrated driving system according to claim 14, wherein the adhesive film consists of a highly viscous, anaerobic adhesive liquid.

16. An integrated driving system according to claim 15, wherein one of the motors is received at least in part within a trough provided in the device chassis.

17. An integrated driving system according to claim 16, wherein one of the motors includes magnets composed of rings which are fitted into each other through grooves and keys.

* * * * *